United States Patent
Jamali et al.

(10) Patent No.: US 11,185,978 B2
(45) Date of Patent: Nov. 30, 2021

(54) DEPTH PERCEPTION MODELING FOR GRASPING OBJECTS

(71) Applicant: HONDA MOTOR CO., LTD., Tokyo (JP)

(72) Inventors: Nawid Jamali, Dublin, CA (US); Soshi Iba, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 16/242,856

(22) Filed: Jan. 8, 2019

(65) Prior Publication Data
US 2020/0215685 A1   Jul. 9, 2020

(51) Int. Cl.
- B25J 9/16 (2006.01)
- B25J 13/08 (2006.01)
- B25J 15/00 (2006.01)

(52) U.S. Cl.
CPC ............ *B25J 9/163* (2013.01); *B25J 9/1697* (2013.01); *B25J 13/084* (2013.01); *B25J 15/0009* (2013.01)

(58) Field of Classification Search
CPC ........ B25J 9/163; B25J 13/084; B25J 9/1697; B25J 15/0009; B25J 9/161; B25J 9/1612; G05B 2219/39473; G05B 2219/39295
USPC .................................................. 700/245–264
See application file for complete search history.

(56) References Cited

U.S. PATENT DOCUMENTS

| | | | | |
|---|---|---|---|---|
| 4,980,626 A | * | 12/1990 | Hess | B25J 9/1005 250/559.33 |
| 7,657,346 B2 | * | 2/2010 | Ban | B25J 9/1697 700/262 |
| 8,781,629 B2 | * | 7/2014 | Ota | B25J 9/1671 700/259 |
| 9,002,098 B1 | | 4/2015 | Chelian et al. | |
| 9,089,966 B2 | * | 7/2015 | Domae | B25J 9/1612 |
| 9,089,971 B2 | * | 7/2015 | Aoba | B25J 9/1697 |
| 9,205,559 B2 | | 12/2015 | Kawanami et al. | |
| 9,785,911 B2 | * | 10/2017 | Galluzzo | G05D 1/0088 |

(Continued)

FOREIGN PATENT DOCUMENTS

| | | |
|---|---|---|
| CN | 105598965 A | 5/2016 |
| CN | 106530297 A | 3/2017 |

(Continued)

OTHER PUBLICATIONS

Calandra et al., "More Than a Feeling: Learning to Grasp and Regrasp Using Vision and Touch," IEEE Robotics and Automation Letters,(8 pages total), 2018.

(Continued)

*Primary Examiner* — Jaime Figueroa
(74) *Attorney, Agent, or Firm* — Arent Fox LLP (57) ABSTRACT

Methods, grasping systems, and computer-readable mediums storing computer executable code for grasping an object are provided. In an example, a depth image of the object may be obtained by a grasping system. A potential grasp point of the object may be determined by the grasping system based on the depth image. A tactile output corresponding to the potential grasp point may be estimated by the grasping system based on data from the depth image. The grasping system may be controlled to grasp the object at the potential grasp point based on the estimated tactile output.

18 Claims, 6 Drawing Sheets

(56) References Cited

U.S. PATENT DOCUMENTS

| | | | |
|---|---|---|---|
| 9,889,564 B2* | 2/2018 | Cronie | B25J 9/1697 |
| 10,089,575 B1* | 10/2018 | Redmon | G06N 3/049 |
| 10,569,414 B2* | 2/2020 | Nakashima | B25J 9/0093 |
| 10,646,999 B2* | 5/2020 | Kundu | B25J 9/1697 |
| 10,723,027 B2* | 7/2020 | Amacker | G05B 19/0426 |
| 10,730,181 B1* | 8/2020 | Rajkumar | B25J 11/008 |
| 10,864,631 B2* | 12/2020 | Davidson | B25J 9/1612 |
| 2006/0012198 A1* | 1/2006 | Hager | B25J 15/0009 294/106 |
| 2012/0072023 A1* | 3/2012 | Ota | B25J 9/1671 700/259 |
| 2013/0189656 A1* | 7/2013 | Zboray | G06F 3/012 434/219 |
| 2015/0032252 A1* | 1/2015 | Galluzzo | B25J 9/162 700/218 |
| 2016/0039553 A1* | 2/2016 | Akdogan | G07F 11/1657 700/240 |
| 2016/0059412 A1* | 3/2016 | Oleynik | B25J 19/02 700/257 |
| 2017/0355078 A1* | 12/2017 | Ur | G06K 9/6202 |
| 2018/0361588 A1 | 12/2018 | Du et al. | |
| 2019/0126471 A1* | 5/2019 | Kobayashi | B25J 9/1669 |
| 2019/0176326 A1* | 6/2019 | Bingham | B25J 9/161 |
| 2019/0248003 A1* | 8/2019 | Nagarajan | B25J 9/1612 |
| 2020/0019864 A1* | 1/2020 | Gu | G06Q 20/3678 |
| 2020/0101613 A1* | 4/2020 | Yamada | B25J 9/1697 |
| 2020/0164505 A1* | 5/2020 | Boer | G06N 3/04 |
| 2020/0198130 A1* | 6/2020 | Goldberg | G06K 9/00208 |
| 2020/0311616 A1* | 10/2020 | Rajkumar | G06N 3/008 |
| 2021/0023720 A1* | 1/2021 | Du | B25J 9/1669 |

FOREIGN PATENT DOCUMENTS

| | | |
|---|---|---|
| JP | 2006-26875 A | 2/2006 |
| JP | 2007-245326 A | 9/2007 |
| JP | 2013-144355 A | 7/2013 |
| JP | 2015-520040 A | 7/2015 |
| JP | 2015-169515 A | 9/2015 |
| JP | 2017-185578 A | 10/2017 |
| WO | WO 2017/183414 A1 | 10/2017 |
| WO | WO 2017/199261 A1 | 11/2017 |

OTHER PUBLICATIONS

Lenz et al., "Deep learning for detecting robotic grasps", The International Journal of Robotics Research, 2015, vol. 34(4-5), (pp. 705-724), DOI:10.1177/0278364914549607.

Mahler et al., "Learning deep policies for robot bin picking by simulating robust grasping sequences" 1st Conference on Robot Learning, 2017, (10 pages total).

Masuta et al., "Plane Extraction using Point Cloud Data for Service Robot", Toyama Prefectural University Dept. of Intelligent Systems Design Engineering,Imizu, Toyama, Japan, 2016, (10 pages total).

Morrison et al., "Closing the Loop for Robotic Grasping: A Real-time, Generative Grasp Synthesis Approach", Australian Centre for Robotic Vision, Queensland University of Technology Brisbane, Australia, 4000, arXiv:1804.05172v2 [cs.RO] May 15, 2018, (10 pages total).

Rao et al., "Grasping Novel Objects with Depth Segmentation", Oct. 2010, (8 pages total).

Saxena., "Monocular Depth Perception And Robotic Grasping Of Novel Objects", Stanford University, a Partial Fulfillment Of The Requirements For The Degree of Doctor Of Philosophy, Jun. 2009, (217 pages total).

Ten Pas et al. "Grasp pose detection in point clouds", The International Journal of Robotics Research, 2017, (17 pages total).

Communication dated Dec. 1, 2020, from the Japanese Patent Office in counterpart application No. 2019-233680.

Notice of Reasons for Refusal dated Jul. 13, 2021, from the Japanese Patent Office in related application No. 2019-233680.

\* cited by examiner

DEPTH PERCEPTION MODELING FOR GRASPING OBJECTS

TECHNICAL FIELD

Aspects of the present disclosure relate generally to controlling robots, and more particularly, to the use of depth perception modeling to assist a robot in grasping an object.

BACKGROUND

Robots perform object grasping operations to manipulate objects. Grasping operations may include the use of tactile data to allow a robot to contact a surface of the object and determine how to grasp the object. Tactile data may include data accumulated by way of repetitive attempts by the robot to contact the object. These repetitive attempts to contact the object may assist the robot in learning characteristics of the object such as the shape and material of the object, as well as identifying areas of the object that are most suitable for the robot to grasp the object. Grasping operations that include multiple contact attempts to generate the tactile data may be time consuming and inefficient for the robot and may also cause damage to the object. Therefore, an unmet need remains in the art for methods and systems to improve grasping operations used by robots.

SUMMARY

The following presents a summary of one or more aspects of the disclosure in order to provide a basic understanding of such aspects. This summary is not an extensive overview of all contemplated aspects, and is neither intended to identify key or critical elements of all aspects nor delineate the scope of any or all aspects. Its sole purpose is to present some concepts of one or more aspects of the disclosure in a simplified form as a prelude to the more detailed description that is presented later.

In an example, a method for grasping an object by a grasping system is disclosed. The method may include obtaining a depth image of the object. The method may also include determining a potential grasp point of the object based on the depth image. The method may further include estimating a tactile output corresponding to the potential grasp point based on data from the depth image. The method may also include controlling the grasping system to grasp the object at the potential grasp point based on the estimated tactile output.

In another example, a grasping system for grasping an object is provided. The grasping system may include a memory and at least one processor coupled with the memory. The at least one processor may be configured to obtain a depth image of the object. The at least one processor may also be configured to determine a potential grasp point of the object based on the depth image. The at least one processor may further be configured to estimate a tactile output corresponding to the potential grasp point based on data from the depth image. The at least one processor may also be configured to control the grasping system to grasp the object at the potential grasp point based on the estimated tactile output.

In another example, a computer-readable medium storing computer executable code for grasping an object by a grasping system is provided. The computer-readable medium may include code for obtaining a depth image of the object. The computer-readable medium may also include code for determining a potential grasp point of the object based on the depth image. The computer-readable medium may further include code for estimating a tactile output corresponding to the potential grasp point based on data from the depth image. The computer-readable medium may also include code for controlling the grasping system to grasp the object at the potential grasp point based on the estimated tactile output.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative variations when read in conjunction with the accompanying drawings, wherein:

DETAILED DESCRIPTION

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known components are shown in block diagram form in order to avoid obscuring such concepts.

Described herein are aspects related to the use of depth perception modeling to assist a robot in grasping an object. To avoid multiple attempts for direct contact with the object by the robot, the present disclosure may estimate the output of a tactile sensor based on depth data corresponding to the surface of the object through the use of a neural network trained by deep learning. The estimated tactile output may be determined before the robot attempts to contact the surface of the object.

A robot may include a grasping system to obtain depth data via a depth sensor that senses the structure of the surface of the object. The robot may select a region of interest, equal to the size of the tactile sensor, based on the depth data. The depth sensor data from the region of interest may be used as the input for the neural network. The neural network may estimate the output that a tactile sensor would have produced if the robot had contacted the object. In other words, the neural network may generate tactile data without the robot making physical contact with the object.

Such a system may significantly benefit robot manipulation by reducing or eliminating the need for a robot to contact an object prior to grasping the object. Instead, the robot may be able to grasp the object on a first attempt based on the data from the neural network.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, system-on-a-chip (SoC), and other suitable hardware configured to perform the various functionality described herein.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Figure 1:
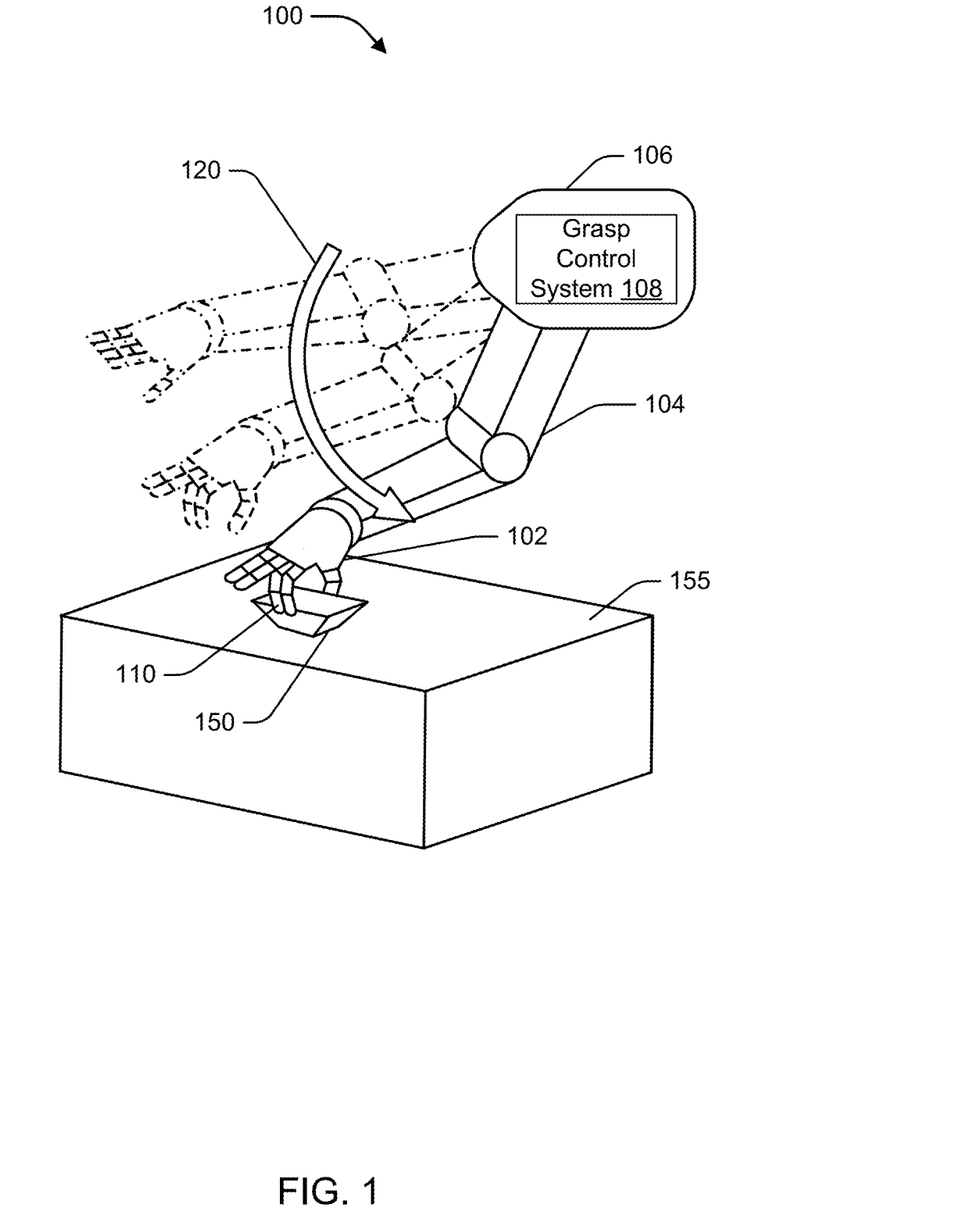
FIG. 1 illustrates a conceptual view of an example grasping system according to aspects of the disclosure.

FIG. 1 illustrates a conceptual view of an example grasping system 100 according to aspects of the disclosure. It will be apparent to those skilled in the art that some or all of the portions of the grasping system 100 may be a part of larger robotic device such as, but not limited to, a humanoid robot. In this conceptual view, the grasping system 100 may be tasked with grasping the object 150 set on top of the surface 155.

The grasping system 100 may include a grasping device 102 configured to grasp the object 150. Examples of the grasping unit 102 may include a robotic hand, pincer, claw, or any other robotic device capable of grasping an object. The grasping device 102 may be connected to an extension unit 104, such as a robotic arm, which may be connected to a body 106, illustrated as a shoulder, of a robot. The grasping system 100 may also include a grasp control system 108 to control the grasping device 102. Further, in some examples, the grasping system 100 may include one or more tactile sensors 110 to generate tactile data based on the grasping device 102 physically contacting the object 150.

In an example, the grasping system 100 may manipulate the object 150, by estimating tactile output (e.g., textures, edges, or contours of object 150) before contacting the object 150. As described in more detail later, the grasping device 102 may obtain depth data to estimate the tactile output before contacting the object 150. The grasp control system 108 may then utilize the estimated tactile output to control the grasping device 102 to contact the object 150 during a grasping operation 120. Use of the estimated tactile output may prevent repeated physically contacts by the grasping device 102 with the object 150 and therefore prevent unsuccessful grasps and/or damage to the object 150. Further, in some cases, use of the estimated tactile output may also reduce an amount of time the grasping system 100 needs to physically grasp the object.

Figure 2:
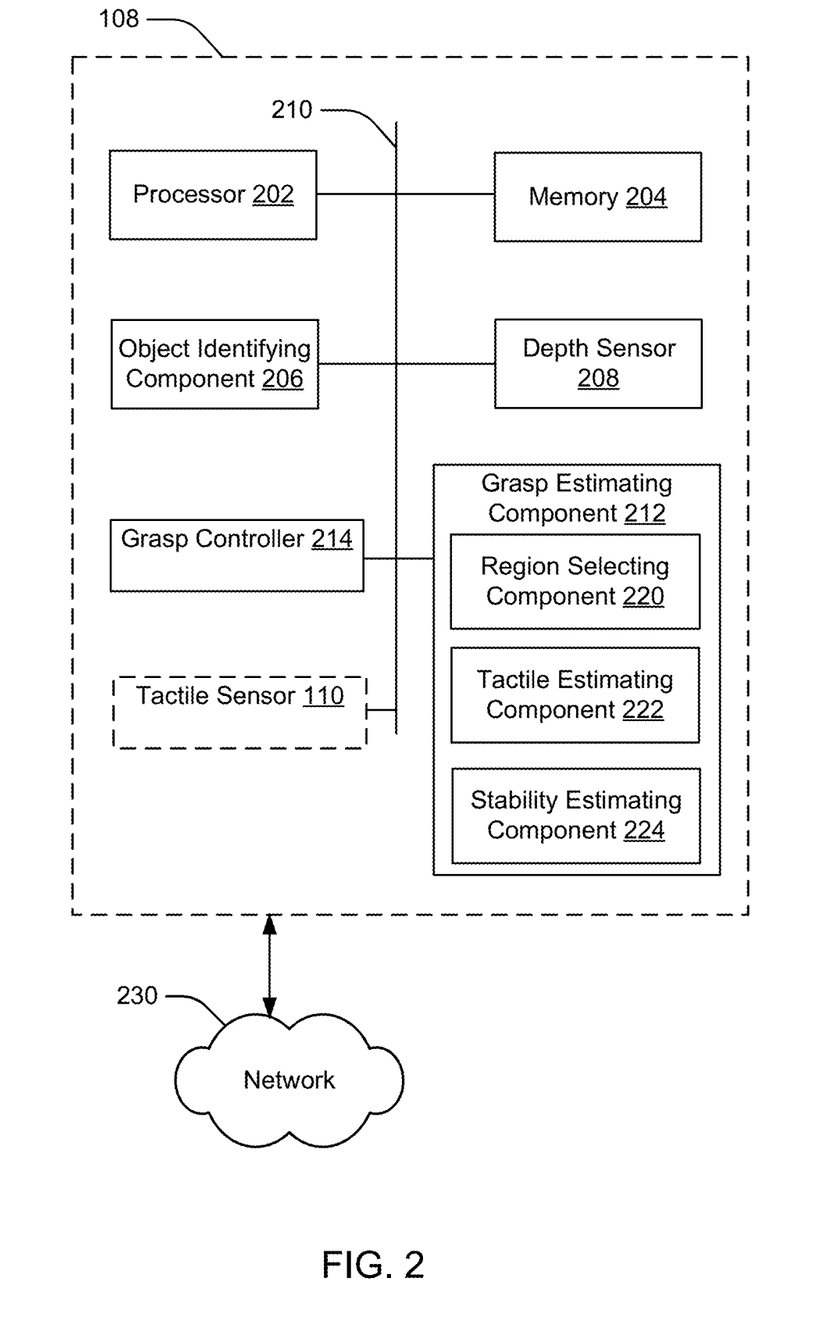
FIG. 2 illustrates a conceptual view of an example estimating operation by the grasping system of FIG. 1 according to aspects of the disclosure.
Figure 3:
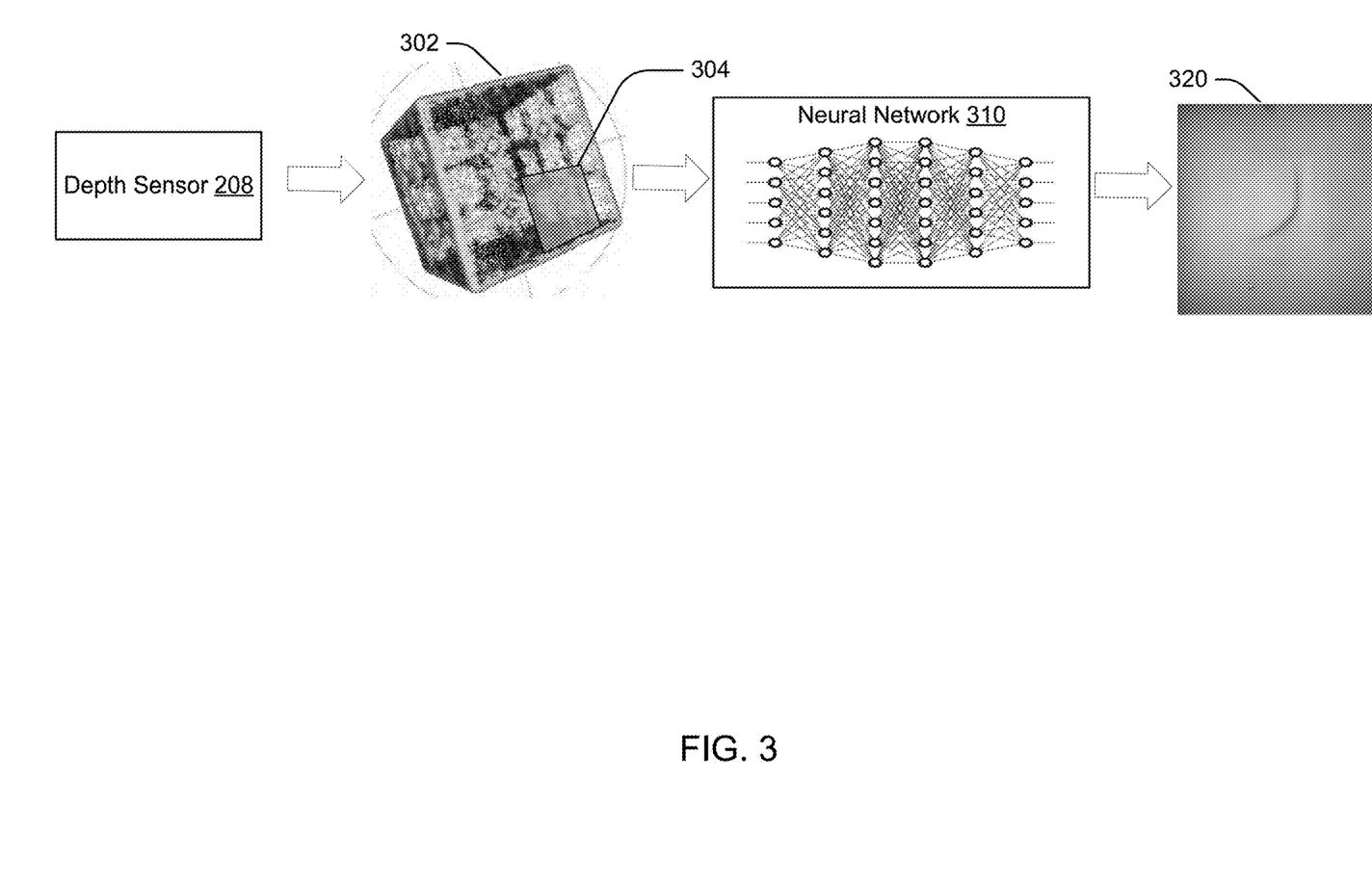
FIG. 3 illustrates a schematic view of example grasping components of the grasping system of FIG. 1 according to aspects of the disclosure.

Referring to FIGS. 2 and 3, which are described in conjunction with the grasping system 100 of FIG. 1, the grasping control system 108 may estimate a tactile output of tactile sensors before the grasping device 102 physically contacts the object 150. FIG. 2 illustrates a conceptual view of an example estimating operation by the grasping system 100 of FIG. 1, according to aspects of the disclosure. FIG. 3 illustrates a schematic view of example grasping components of the grasping system 100 of FIG. 1 according to aspects of the disclosure. The grasping control system 108 may include or be operably coupled with (or executed by) one or more processors 202 and one or more memories 204 that communicate to effectuate certain actions described herein. For example, the one or more processors 202 and/or the one or more memories 104 may execute, and/or store instructions, parameters, etc., for executing, an object identifying component 206 identifying an object for grasping (e.g., object 150), a depth sensor 208 for obtaining an depth image 302 of the object for grasping, a grasp estimating component 212 for estimating a tactile output corresponding to the object for grasping, a grasp controller 214 for controlling the grasp device 102 and/or the grasp system 100 to grasp the object 150 based on estimated tactile output, and/or the tactile sensor 110 for obtaining tactile data of the object 150.

The processor(s) 202, the memory(ies) 204, and various ones of the components 206, 208, 212, and 214, may be operatively coupled via a bus 210. In another example, the processor(s) 202 may execute one or more of the various components 206, 208, 212, 214, and 110 to perform functions described herein, while being operatively coupled to the memory(ies) 204 and/or other components via the bus 210.

In an example, the object identifying component 206 may capture an image and/or video of a scene during operation of the grasping system 100 and determine an object from the scene to grasp. In an example, the memory 204 may include an object identification dataset to facilitate identifying one or more objects within the scene. In this example, the object identifying component 206 may identify one or more objects (e.g., object 150) to grasp at the scene based on the one or more objects corresponding to one or more objects of the object identification dataset.

The depth sensor 208 may capture a depth image 302 of the identified object to grasp. The grasp estimating component 212 may include a region selecting component 220 to receive depth data from the depth sensor 208 and select one or more potential grasp points 304 or regions of interest of the depth image for grasping the object to grasp. In an example, a grasp proposal system may be used to generate grasp points. The grasp proposal system may uniformly sample one or more points on a convex hull of the object.

The grasp estimating component 212 may also include a tactile estimating component 222 to estimate tactile outputs corresponding to the one or more potential grasp points 304. In an aspect, the tactile estimating component 222 may include a neural network 310 trained through tactile experience data, as described below. The neural network 310 may receive the one or more potential grasp points 304 and based on the one or more potential grasp points 304 estimate tactile outputs that correspond to tactile outputs of a tactile sensor. In other words, the neural network 310 may estimate tactile data of the object 150 without the grasping system 100 making contact with the object 150. In an example, the neural network 310 may receive depth data from the depth sensor 208 and map the depth data to the estimated tactile output.

The grasp estimating component 212 may also include a stability estimating component 224 to determine the quality of contact of the potential grasp points based on the estimated tactile outputs. In an example, the stability estimating component 224 may determine the quality of the contact of the potential grasp point by calculating the percentage of the area of contact in an estimated output.

The stability estimating component 224 may also estimate a probability of success to grasp the object 150 at each of the potential grasp points based on the estimated tactile outputs. In an example, the stability estimating component 224 may estimate a probability of success to grasp the object 150 based on a supervised learning method. For example, the stability estimating component 224 may use a neural network with a tactile sensor estimate (or its latent repetition) as input. During the learning method used by the neural network, a grasping device may perform grasp actions to lift test objects. A ratio of successful lifts of the test objects may be used to determine a probability of grasping objects. Accordingly, the stability estimating component 224 may use the data obtained via the neural network and the depth data to estimate a probability of success to grasp the object 150 at each of the potential grasp points.

The grasp estimating component 212 may include a grasp synthesizer that determines the best location to grasp the object 150. An example of the grasp synthesizer may include Dex-Net, which uses a depth sensor to rank potential grasp points of the object 150 and select one grasp point for grasping the object 150.

The grasp controller 214 may control one or more components or systems of the grasping system 100 to grasp the object 150. In an example, the grasp controller 214 may control the grasping system 100 based on one or more of the estimated tactile outputs, the determined quality of contact of the potential grasp points, or the probability of success to grasp the object 150 at the potential grasp points.

In some examples, the tactile sensor 110 may capture tactile data of the object 150 by physically contacting the object 150. The tactile data from the tactile sensor 110 may be used by the grasp controller 214 along with estimated tactile output of the object 150 to control the grasping system 100 to grasp the object 150 In an example, the tactile data from the tactile sensor 110 may be obtained based on a determination by the grasping controller 214 that information in addition to the estimated tactile output is needed to grasp the object 150. For example, the grasping controller 214 may need tactile data from the tactile sensor 110 when one or more of the quality of contact of the potential grasp points, or the probability of success to grasp the object 150 at the potential grasp points is less than a threshold value.

In an aspect, the grasp control system 108 may also connect to a network 230. In some examples, any one of the components may provide or receive data to/from one or more other devices via the network 230 for performing one or more of the functions provided above.

Neural Network Training

Referring to FIG. 3, in an aspect, the neural network 310 may be trained via supervised deep learning to estimate a tactile output of a tactile sensor based on the state of a training object. The estimation may be based on data from a depth sensor (e.g., depth sensor 208), or data from one or more sensors such as a vision sensor or a force sensor. In some examples, the neural network 310 may obtain data from sensors from other grasping systems (not shown). The neural network 310 may collect tactile experience data by, iteratively, making contact with a variety of training objects including natural and synthetic training objects, training objects of different shapes, and/or training objects with different surface properties. The tactile experience data may include recorded states of an environment at two points in time. The first point of time may be a time just before a grasping system contacts with a training object. At the first point of time, the grasping device, and/or the extension device, are not in contact with the object to grasp, and the grasping device and the extension device are not between the depth sensor and the object to grasp. At the first point of time, the depth sensor may capture a depth image. The second point of time may be a time when the training object is grasped. At the second point of time, a tactile output from a tactile sensor corresponding to a surface of the training object sensed by the depth sensor may be registered.

The next step in training the neural network 310 may include analyzing the recorded states for training the neural network 310. For example, the depth sensor may output points for all surfaces of a training object in the line-of-sight of the depth sensor. An active area of a tactile sensor making contact with an object may be, in general, smaller than surfaces on the object. For example, a surface of an object may be 30 cm×30 cm while a tactile sensor may have an active area of 3 cm×4 cm. Data from the depth sensor may be filtered to include only those points on the training object where the tactile sensor has made contact with the training object. The filtered points may form a volume corresponding to the active area (e.g., a volume of 3 cm×4 cm×1 cm).

In an example, the number of neurons in an input layer of the neural network 310 may need to be constant. However, depth point clouds typically have variable number of points. To this end, the volume may be quantized in to voxels, where a voxel takes the minimum (or average) value of the contact points that fall within that voxel. The quantized volume, in the form of voxels, may be used to train the neural network 310.

An example of a neural network may include a conditional generative adversarial network (GAN). The GAN may be used to produce an estimate of the tactile sensors as image levels and also at latent space levels. The image levels can be used for visualization of the tactile sensor estimates. The latent space levels may be used as a compact representation of the tactile sensor estimates. Once the neural network 310 has learned or incorporated a tactile experience model, the neural network 310 can be used by grasping systems (e.g., grasping system 100) to estimate the tactile output of a tactile sensor without making contact with an object (e.g., object 150).

Figure 4:
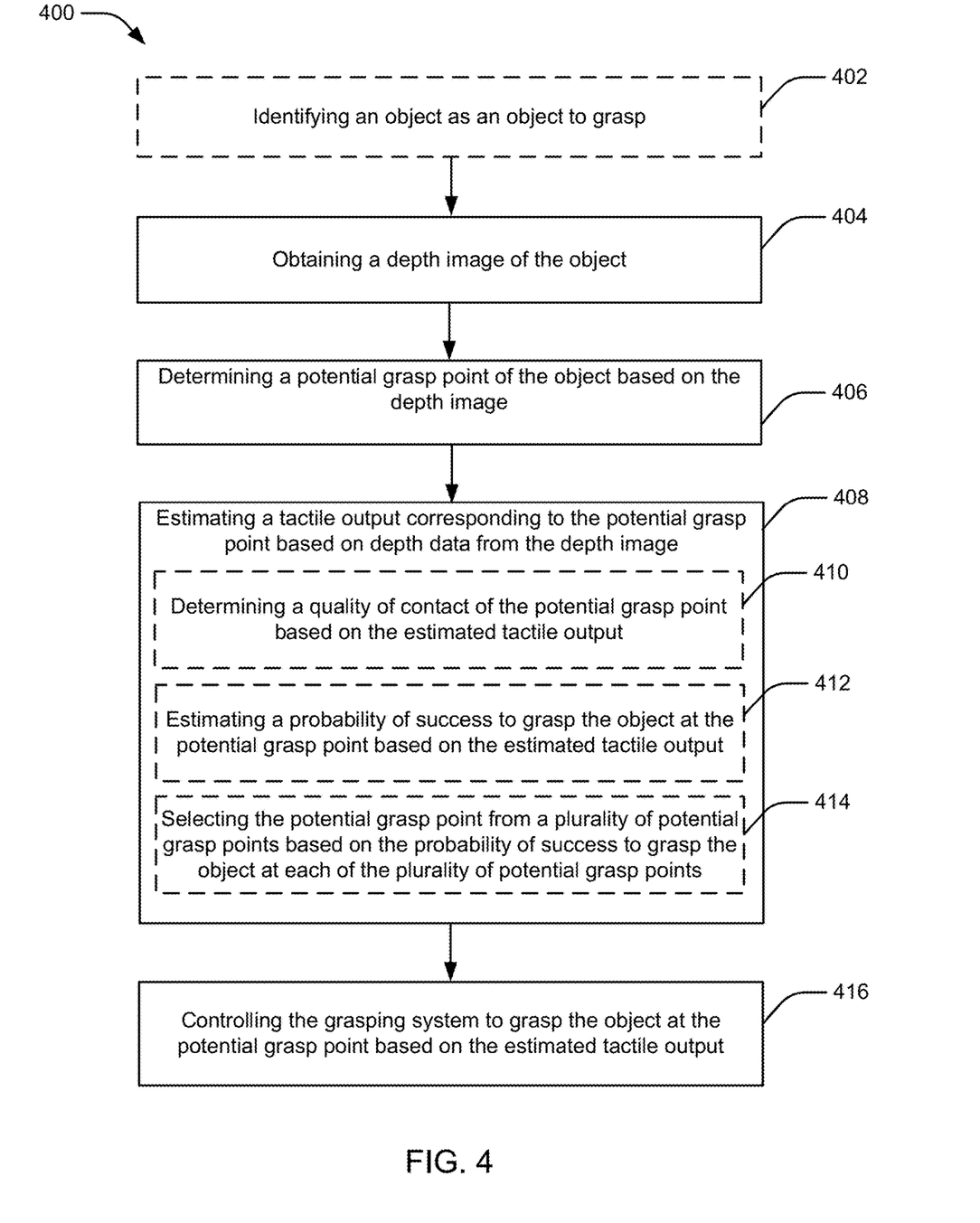
FIG. 4 illustrates a flowchart of an example method for performing a grasping operation according to aspects of the disclosure.

Referring now to FIG. 4, which is described in relation to FIGS. 1-3, an example of a method 400 for performing a grasping operation 120 is illustrated. In an aspect, the method 400 may be performed by the grasping system 100 described herein. For example, one or more of the blocks described herein may be performed by one or more of the components and/or subcomponents (e.g., the one or more processors 202, the one or more memories 204, the object identifying component 206, the depth sensor 208, the grasp estimating component 212, and the grasp controller 214) of the grasping control system 108, which may be a single computing device, distributed across multiple computing devices, etc., and which may be incorporated within or otherwise associated with a grasping system (e.g., grasping system 100) for making grasping control decisions or determinations. In this regard, one or more blocks of the method 400 may be performed (e.g., in full or in part) on a given computing device, on a device at a remote location (e.g., such that results can be shared with the given computing device), etc.

In block 402, the method 400 may optionally include identifying an object as an object to grasp. In an aspect, the object identifying component 206 identify an object from a scene as an object to grasp. The object identifying component 206 may capture an image and/or video of a scene having the object 150 within the scene. The object identifying component 206 may determine to grasp the object 150 based on a comparison to objects identified in an object identification dataset stored by the memory 204.

At block 404, the method 400 may include obtaining a depth image of the object. In an aspect, the depth sensor 208 may be configured to obtain a depth image of the object. At block 406, the method 400 may include determining a potential grasp point of the object based on the depth image. In an aspect, the grasp estimating component 212 and/or the region selecting component 220 may determine a potential grasp point of the object based on the depth image.

At block 408, the method 400 may include estimating a tactile output corresponding to the potential grasp point based on data from the depth image. In an aspect, the grasp estimating component 212 and/or the tactile estimating component 222 may estimate a tactile output corresponding to the potential grasp point based on data from the depth image. For example, the grasp estimating component 212 and/or the tactile estimating component 222 may include the neural network 310 trained through tactile experience data. In an example, the neural network 310 may receive one or more potential grasp points 304 and based on the one or more potential grasp points 304 estimate tactile outputs that correspond to tactile outputs of a tactile sensor.

At block 410, the method 400 may optionally include determining a quality of contact of the potential grasp point based on the estimated tactile output. In an aspect, the grasp estimating component 212 and/or the stability estimating component 224 may be configured to determine a quality of contact of the potential grasp point based on the estimated tactile output. For example, the grasp estimating component 212 and/or the stability estimating component 224 may include a grasp synthesizer, such as Dex-Net, to determine the potential grasp point based on depth sensor.

At block 412, the method 400 may optionally include estimating a probability of success of grasping the object at the potential grasp point based on the estimated tactile output. In an aspect, the grasp estimating component 212 and/or the stability estimating component 224 may be configured to estimate a probability of success of grasping the object 150 at the potential grasp point based on the estimated tactile output.

At block 414, the method 400 may optionally include selecting the potential grasp point from a plurality of potential grasp points based on the probability of success of grasping the object at each of the plurality of potential grasp points. In an aspect, the grasp estimating component 212 and/or the stability estimating component 224 may be configured to select the potential grasp point from a plurality of potential grasp points based on the probability of success of grasping the object 150 at each of the plurality of potential grasp points.

At block 416, the method 400 may include controlling the grasping system to grasp the object at the potential grasp point based on the estimated tactile output. In an aspect, the grasp controller 214 may control the grasping system 100, including the grasping device 102 and/or the extension device 104, to grasp the object at the potential grasp point based on the estimated tactile output.

In some examples, the grasp controller 214 may control the grasping system 100, including the grasping device 102 and/or the extension device 104, to grasp the object at the potential grasp point based on the quality of contact at the potential grasp point.

In some examples, the grasp controller 214 may control the grasping system 100, including the grasping device 102 and/or the extension device 104, to grasp the object at the potential grasp point based on the probability of success of grasping the object.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 500 is shown in FIG. 5.

Figure 5:
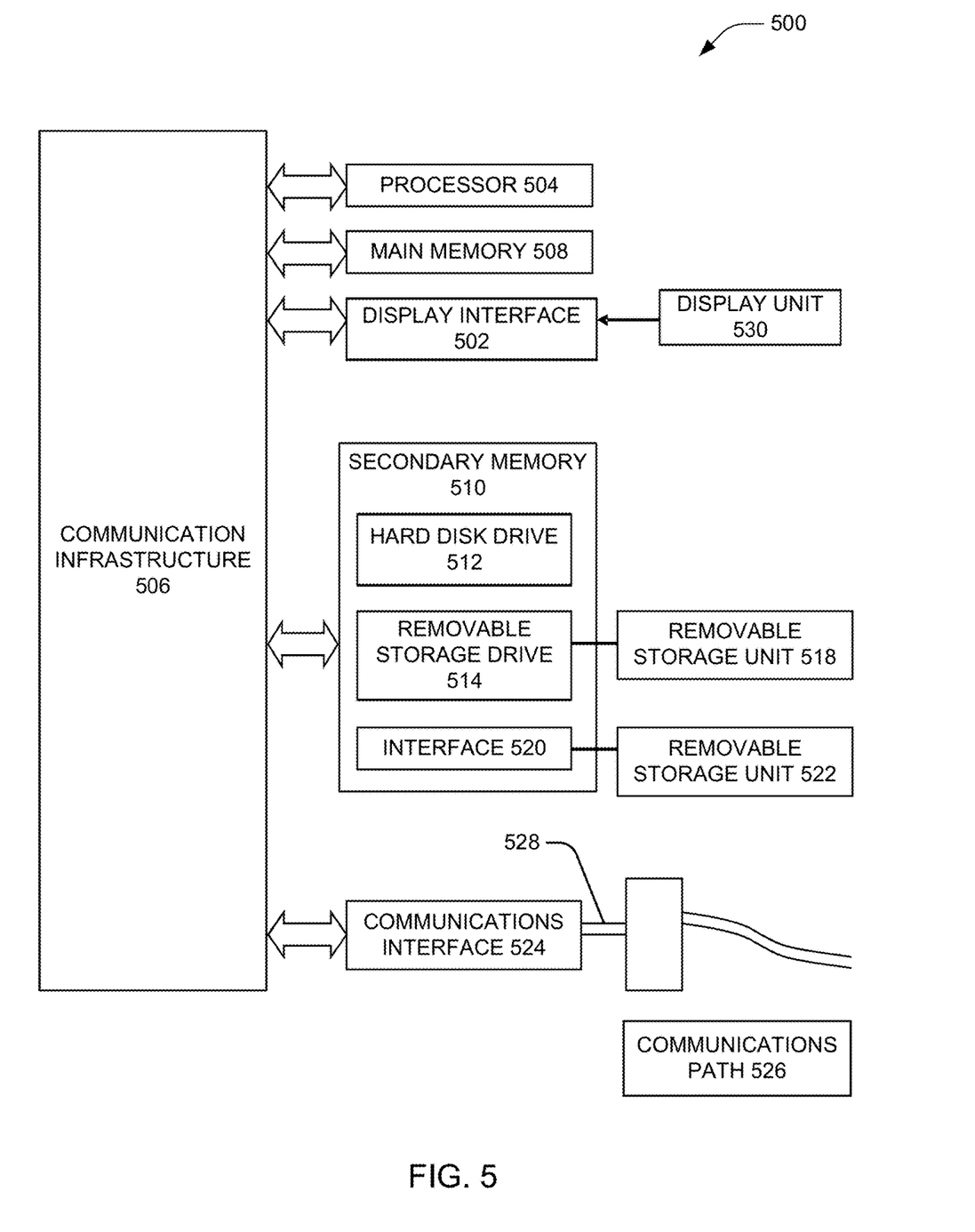
FIG. 5 illustrates an example system diagram of various hardware components and other features according to aspects of the disclosure.

FIG. 5 presents an example system diagram of various hardware components and other features, for use in accordance with an aspect of the present disclosure. the computer system 500 includes one or more processors, such as processor 504. The processor 504 is connected to a communication infrastructure 506 (e.g., a communications bus, crossover bar, or network). In one example, the processor 202 can include the processor 504. Various software aspects are described in terms of this example computer system 500. After reading this description, it will become apparent to a person skilled in the relevant art(s) how to implement aspects described herein using other computer systems and/or architectures.

The computer system 500 can include a display interface 502 that forwards graphics, text, and other data from the communication infrastructure 506 (or from a frame buffer not shown) for display on a display unit 530. The computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. The removable storage unit 518, represents a floppy disk, magnetic tape, optical disk, etc., which is read by and written to the removable storage drive 514. As will be appreciated, the removable storage unit 518 includes a computer usable storage medium having stored therein computer software and/or data.

In alternative aspects, the secondary memory 510 can include other similar devices for allowing computer programs or other instructions to be loaded into the computer system 500. Such devices can include, for example, a removable storage unit 522 and an interface 520. Examples of such can include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to the computer system 500. In an example, the memory 204 can include one or more of the main memory 508, the secondary memory 510, the removable storage drive 514, the removable storage unit 518, the removable storage unit 522, etc.

The computer system 500 can also include a communications interface 524. The communications interface 524 allows software and data to be transferred between the computer system 500 and external devices. Examples of the communications interface 524 can include a modem, a network interface (such as an Ethernet card), a communications port, a Personal Computer Memory Card International Association (PCMCIA) slot and card, etc. Software and data transferred via communications interface 524 are in the form of signals 528, which can be electronic, electromagnetic, optical or other signals capable of being received by communications interface 524. These signals 528 are provided to the communications interface 524 via a communications path (e.g., channel) 526. The communications path 526 carries signals 528 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. The computer program products provide software to the computer system 500. Aspects described herein can be directed to such computer program products.

Computer programs (also referred to as computer control logic) are stored in the main memory 508 and/or the secondary memory 510. The computer programs can also be received via the communications interface 524. Such computer programs, when executed, enable the computer system 500 to perform various features in accordance with aspects described herein. In particular, the computer programs, when executed, enable the processor 504 to perform such features. Accordingly, such computer programs represent controllers of the computer system 500. The computer programs can include the object identifying component 206, the grasp estimating component 212, the grasp controller 214, and/or subcomponents of these components, as described herein.

In variations where aspects described herein are implemented using software, the software can be stored in a computer program product and loaded into the computer system 500 using the removable storage drive 514, the hard disk drive 512, or the communications interface 520. The control logic (software), when executed by the processor 504, causes the processor 504 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 6:
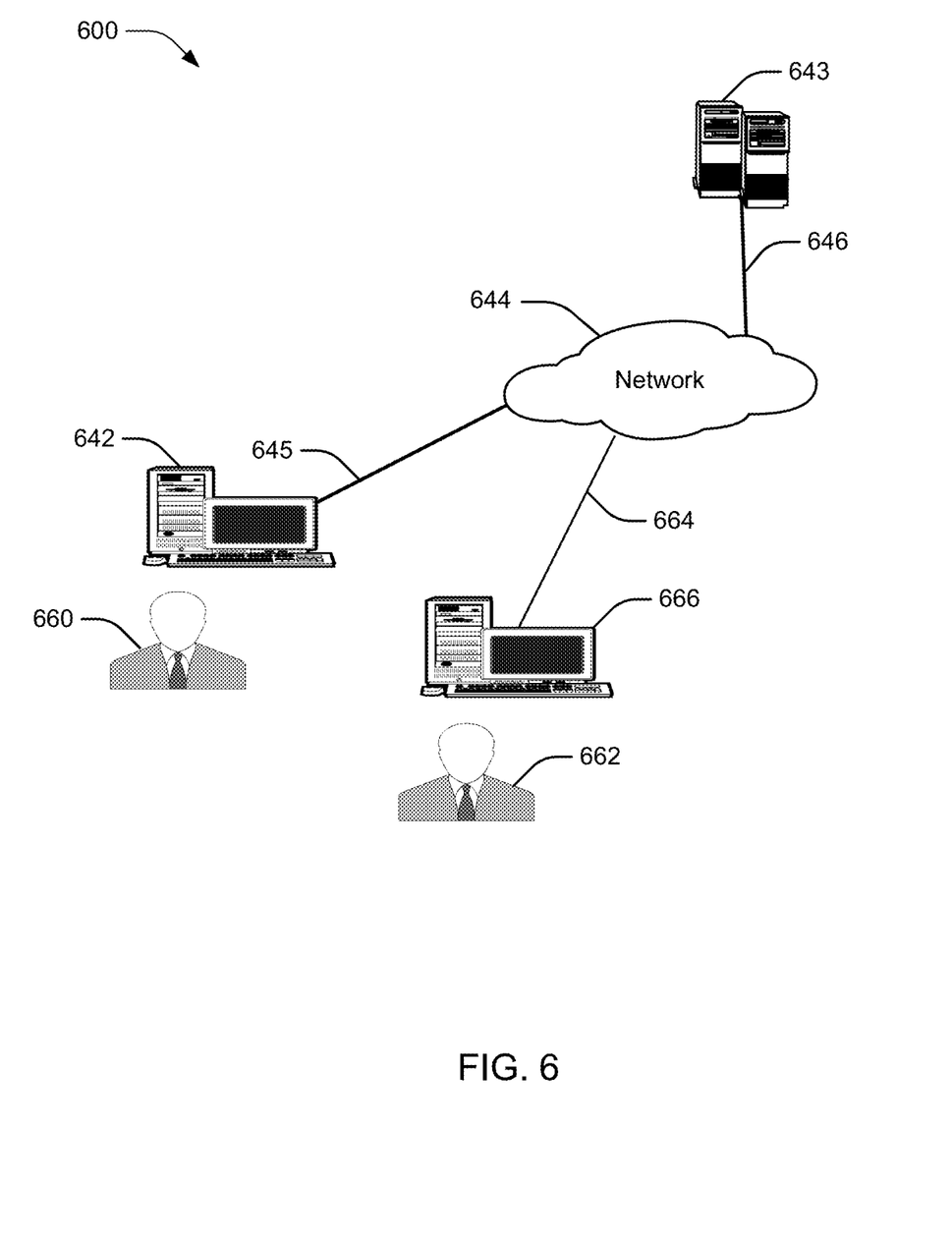
FIG. 6 illustrates a block diagram of various example system components according to aspects of the disclosure.

FIG. 6 is a block diagram of various example system components, in accordance with an aspect. FIG. 6 shows a communication system 600 usable in accordance with aspects described herein. The communication system 600 includes one or more accessors 660, 662 (also referred to interchangeably herein as one or more "users") and one or more terminals 642, 666. For example, the terminals 642, 666 can be computing devices that may include a processor (e.g., processor 202), memory (e.g., memory 204). In one aspect, data for use in accordance with aspects described herein is, for example, input and/or accessed by the accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for grasping an object by a grasping system, comprising:
    identifying the object as an object to grasp based on a comparison to objects in an object identification dataset stored by a memory of the grasping system;
    obtaining, from a depth sensor of the grasping system, data from a depth image of the object in response to identifying the object as the object to grasp;
    determining a potential grasp point of the object based on the data from the depth image;
    estimating a tactile output corresponding to the potential grasp point based on the data from the depth image, the estimated tactile output including an estimated texture of the object at the potential grasp point; and
    controlling the grasping system to grasp the object at the potential grasp point based on the estimated tactile output.

2. The method of claim 1, wherein the estimating of the tactile output comprises:
    supplying the data from the depth image to a neural network trained with tactile experience data; and
    mapping, by the neural network, the data from the depth image to the estimated tactile output.

3. The method of claim 2, wherein the tactile experience data includes data corresponding to recorded states of environments prior to and after one or more grasping devices contacts one or more training objects.

4. The method of claim 1, further comprising:
    determining a quality of contact of the potential grasp point based on the estimated tactile output,
    wherein the controlling of the grasping system to grasp the object is further based on the quality of contact at the potential grasp point.

5. The method of claim 1, further comprising:
    estimating a probability of success of grasping the object at the potential grasp point based on the estimated tactile output,
    wherein the controlling of the grasping system to grasp the object is further based on the probability of success of grasping the object.

6. The method of claim 5, further comprising:
    selecting the potential grasp point from a plurality of potential grasp points based on the probability of success of grasping the object at each of the plurality of potential grasp points.

7. A grasping system for grasping an object, comprising:
    a memory;
    a depth sensor; and
    at least one processor coupled with the memory and the depth sensor and configured to:
        identify the object as an object to grasp based on a comparison to objects in an object identification dataset stored by the memory;
        obtain, from the depth sensor, data from a depth image of the object in response to identifying the object as the object to grasp;
        determine a potential grasp point of the object based on the data from the depth image;
        estimate a tactile output corresponding to the potential grasp point based on the data from the depth image, the estimated tactile output including an estimated texture of the object at the potential grasp point; and
        control the grasping system to grasp the object at the potential grasp point based on the estimated tactile output.

8. The grasping system of claim 7, wherein the at least one processor is further configured to:
    supply the data from the depth image to a neural network trained with tactile experience data; and
    map, by the neural network, the data from the depth image to the estimated tactile output.

9. The grasping system of claim 8, wherein the tactile experience data includes data corresponding to recorded states of environments prior to and after one or more grasping devices contacts one or more training objects.

10. The grasping system of claim 7, wherein the at least one processor is further configured to:
    determine a quality of contact of the potential grasp point based on the estimated tactile output; and
    control the grasping system to grasp the object further based on the quality of contact at the potential grasp point.

11. The grasping system of claim 7, wherein the at least one processor is further configured to:
    estimate a probability of success of grasping the object at the potential grasp point based on the estimated tactile output; and
    control the grasping system to grasp the object based on the probability of success of grasping the object.

12. The grasping system of claim 11, wherein the at least one processor is further configured to:
    select the potential grasp point from a plurality of potential grasp points based on the probability of success of grasping the object at each of the plurality of potential grasp points.

13. A non-transitory computer-readable medium storing computer executable code for grasping an object by a grasping system, the code comprising:
    code for identifying the object as an object to grasp based on a comparison to objects in an object identification dataset stored by a memory of the grasping system;
    code for obtaining, from a depth sensor of the grasping system, data from a depth image of the object in response to identifying the object as the object to grasp;
    code for determining a potential grasp point of the object based on the data from the depth image;
    code for estimating a tactile output corresponding to the potential grasp point based on the data from the depth image, the estimated tactile output including an estimated texture of the object at the potential grasp point; and code for controlling the grasping system to grasp the object at the potential grasp point based on the estimated tactile output.

14. The non-transitory computer-readable medium of claim 13, further comprising:
   code for supplying the data from the depth image to a neural network trained with tactile experience data; and
   code for mapping, by the neural network, the data from the depth image to the estimated tactile output.

15. The non-transitory computer-readable medium of claim 14, wherein the tactile experience data includes data corresponding to recorded states of environments prior to and after one or more grasping devices contacts one or more training objects.

16. The non-transitory computer-readable medium of claim 13, further comprising:
   code for determining a quality of contact of the potential grasp point based on the estimated tactile output; and
   code for controlling the grasping system to grasp the object further based on the quality of contact at the potential grasp point.

17. The non-transitory computer-readable medium of claim 13, further comprising:
   code for estimating a probability of success of grasping the object at the potential grasp point based on the estimated tactile output, and
   code for controlling the grasping system to grasp the object further based on the probability of success of grasping the object.

18. The non-transitory computer-readable medium of claim 8, further comprising:
   code for selecting the potential grasp point from a plurality of potential grasp points based on the probability of success of grasping the object at each of the plurality of potential grasp points.

* * * * *